US009112435B2

(12) United States Patent
Lane

(10) Patent No.: US 9,112,435 B2
(45) Date of Patent: Aug. 18, 2015

(54) CHARGED PARTICLE INDUCTION FROM IONOSPHERE TO GROUND

(71) Applicant: Glenn E. Lane, Ocala, FL (US)

(72) Inventor: Glenn E. Lane, Ocala, FL (US)

(73) Assignee: GLENN LANE FAMILY LIMITED LIABILITY LIMITED PARTNERSHIP, Summerfield, FL (US)

( * ) Notice: Subject to any disclaimer, the term of this patent is extended or adjusted under 35 U.S.C. 154(b) by 0 days.

(21) Appl. No.: 14/197,698

(22) Filed: Mar. 5, 2014

(65) Prior Publication Data

US 2014/0185180 A1     Jul. 3, 2014

Related U.S. Application Data

(63) Continuation of application No. 12/917,447, filed on Nov. 1, 2010, now Pat. No. 8,693,160.

(60) Provisional application No. 61/280,131, filed on Oct. 31, 2009.

(51) Int. Cl.
*H01T 23/00* (2006.01)
*H02N 99/00* (2006.01)
*H05F 7/00* (2006.01)

(52) U.S. Cl.
CPC . *H02N 99/00* (2013.01); *H05F 7/00* (2013.01)

(58) Field of Classification Search
CPC ........................................ H01T 23/00

USPC .......................................... 361/231
See application file for complete search history.

(56) References Cited

U.S. PATENT DOCUMENTS

| 3,719,829 | A | 3/1973 | Vaill |
| 4,223,241 | A | 9/1980 | Paszyc et al. |
| 5,726,855 | A | 3/1998 | Mourou et al. |
| 6,377,436 | B1 | 4/2002 | Margolin |
| 6,650,297 | B2 | 11/2003 | Anderson et al. |
| 8,693,160 | B2 * | 4/2014 | Lane ............................ 361/231 |
| 8,772,974 | B2 * | 7/2014 | Lane ............................ 307/104 |
| 2002/0037653 | A1 | 3/2002 | Herchen |
| 2009/0171477 | A1 | 7/2009 | Nafyeh et al. |

OTHER PUBLICATIONS

Chin, S.L., et al., "Advances in Intense Femtosecond Laser Filamentation in Air," *Laser Physics*, 2012, vol. 22, No. 1, pp. 1-53.

* cited by examiner

*Primary Examiner* — Stephen W Jackson
(74) *Attorney, Agent, or Firm* — Saliwanchik, Lloyd & Eisenschenk

(57) ABSTRACT

A charged particle induction apparatus and method comprising a high power light emitting means, such as a laser array, in operable communication with a high energy output means to accomplish initiation of at least two concentric plasma channels in atmosphere extending from the Earth's surface to the charge-rich upper atmosphere, including the ionosphere, for the transmission of charged particles therethrough to ground using the surrounding atmosphere as an insulator. The transmitted energy is drawn down (due to an artificially created potential) through the conductive plasma channels to collection means.

20 Claims, 3 Drawing Sheets

CHARGED PARTICLE INDUCTION FROM IONOSPHERE TO GROUND

CROSS-REFERENCE TO RELATED APPLICATIONS

The present application is a continuation of U.S. patent application Ser. No. 12/917,447, filed Nov. 1, 2011, which claims the benefit of U.S. Provisional Application Ser. No. 61/280,131, filed Oct. 31, 2009, which is hereby incorporated by reference herein in its entirety, including any figures, tables, or drawings.

FIELD OF THE INVENTION

The present invention relates to the transmission of ionospheric energy through at least two "ionosphere-to-ground" coaxial laser-induced plasma channels formed through the Earth's atmosphere. As used herein, the term "ionophereric energy" means charged particles, namely ions and electrons, in the ionosphere. As used herein, the term "channel" means a conduit having walls comprised of ionized or partially ionized gas, the channel being substantially ring-shaped in cross-section, the walls serving as the conductive path through which charged particles are induced to ground.

BACKGROUND OF THE INVENTION

The need to develop alternative clean renewable energy supplies is becoming critical. Problems of climate change and global warming due to carbon emissions are becoming an accepted fact. The dramatic rise in the cost of petro-chemical energy is due to decreased supplies and increase in world demand. There is increasing political instability of regions of the world that have large oil supplies. There are geo-political and economic ramifications of being dependent on imported energy or on being economically dependent on the export of energy from dwindling energy reserves.

Heretofore, space solar power has been considered as an alternative clean energy source. Space solar power is clean, inexhaustible, available 24 hours a day, and has the potential to generate as much energy as terrestrial power plants. However, because of the filtering effect of the Earth's atmospheric gases (air acts as an insulator), and for other reasons such as reflection and absorption, only a fraction of solar energy in any given area reaches Earth. The average solar power per unit area outside Earth's atmosphere during any given time period is about 136% that available on Earth's surface during direct sunlight (1336 W/m2). Various apparatus and methods have been considered, and some developed, to compensate for this shortcoming.

A very recent proposed solution is described in pending U.S. Patent Application No. 2009/0171477 of Neyfeh et al. which describes systems and methods that employ high-intensity lasers to set up a thin plasma sheet, also called a waveguide or "hot shell", in the atmosphere as a function of beam intensity and geometry. A laser beam can be spread and directed with physical optics to generate a thin inverted cone-shaped hot shell waveguide in the atmosphere. According to Neyfeh, the hot shell of the waveguide has a different index of refraction from that of the surrounding air layers and as such serves to internally reflect portions of the entering solar ray entering an aperture in the hot shell, toward the tip of the cone and a solar energy storage component positioned there, thus providing a virtual solar energy concentration system. The Neyfeh et al. systems and methods, therefore, endeavor to make the best of the filtered solar energy present in Earth's atmosphere.

Another proposed solution is to collect the Sun's energy in space, where it is more concentrated, via satellite-based or lunar-based collection stations. The energy must then be transmitted from the collection point in space to the Earth's surface. Since wires extending from Earth's surface to an orbiting satellite would be impractical, many space-based solar power designs have proposed the use of microwave or laser beams for wireless power transmission. The collecting station would convert solar energy into electrical energy, which would then be used to power a microwave emitter or laser directed at a collector on the Earth's surface. There are numerous technical, political, legal and economic challenges to building space solar power stations. Limitations in photovoltaic technology and the difficulty of building large structures in space are some of the issues. In the past, launch costs have been prohibitive. In addition to the relatively high costs involved with this method, other problems include cumulative radiation damage or micrometeoroid impacts.

The underlying physics of wireless power transmission resembles that of wireless communications, but with an important difference. Unlike information transfer, where the percentage of received power must be only sufficiently high enough to recover the signal, wireless power transmission places a critical emphasis on the maximum amount of possible energy transfer and conversion efficiency. Ideally, a wireless power transmission system would have the ability to transmit any amount of power to any point in space, but practical limitations such as conversion efficiencies at the source and the receiver, and disturbances in the transmission medium will always limit the performance of an implemented system.

For instance, as recently as 2006, the highest amount of energy obtained from a receiver when testing high intensity lasers to illuminate vertical multi junction solar cells developed by NASA-GRC was 23.7778 watts. One vertical multi junction solar cell was able to achieve a power density of 13.6 watts per $cm^2$, at a conversion efficiency of 24%. Although these experiments confirm that the VMJ technology can withstand and utilize the high intensity laser energy without damage or significant reduction in previously known conversion efficiencies, wireless power transmission via high intensity laser beaming technology is not yet ready for high order energy transfer. In short, the main limiting factors to the laser power beaming system are the conversion efficiencies of the laser (electrical to photonic) and the photovoltaic cells (photonic to electrical). Although there are a variety of photovoltaic cells on the market approaching conversion efficiencies of 40% (such as triple junction cells), these technologies cannot operate at intensities 1000 times or greater than that of the sun.

Based on the above, it is clear that there is a strong desire to harness the energy existing in both our atmosphere and beyond, but it is apparent that the various methods and apparatus designed to capture and utilize this energy source are attendant with various, problems, shortcomings and limitations.

SUMMARY OF THE INVENTION

In order to meet the need in the art, the subject invention presents an entirely different approach to "tapping" this vast energy source. At least one preferred embodiment of the invention is discussed below.

The Earth's surface—ocean and solid—and the ionosphere are highly conductive. The atmosphere conducts electricity because of the presence of positive and negative ions plus free electrons. Conductivity is poor near sea level but increases rapidly with height up to the ionosphere; also it is greater at polar latitudes than equatorial. Between ground and the Ionosphere, the atmosphere acts an insulator.

The ionosphere begins at a height of about 50 km (30 miles) above the Earth's surface, but it is most distinct and important above 80 km (50 miles). In the photochemical ionosphere (which is mostly contained within the thermosphere but also partly extends into the neighboring mesosphere), cosmic radiation of high-energy sub-atomic particles and the absorption of much of the solar ultraviolet radiation separates negative electrons from oxygen and nitrogen molecules. The ions and free electrons move rapidly under the influence of electrical forces—the ionospheric wind—and the ionosphere is highly conductive in this region. During fair weather there is an electric potential difference of 250,000 to 500,000 volts between the ionosphere and the Earth's surface, the surface being negative relative to the ionosphere. This, incidentally, gives rise to the fair weather current, which is a steady flow of electrons from the surface at about one microwatt per square meter. The subject invention is directed generally toward the exploitation of this electric potential difference, and more specifically to a system, method and apparatus for inducing a flow of charged particles from the charged upper atmosphere, including but not limited to the ionosphere, to ground through concentric laser induced plasma channels ("con-channels").

It is widely recognized that a laser beam of suitable wavelength can penetrate through a gas medium over great distances and will establish a partially ionized trail therethrough. Examples of laser systems used to produce a thin ionizing beam through the atmosphere are taught in U.S. Pat. No. 3,719,829 issued to Vaill in 1973 entitled, Laser Beam Techniques and U.S. Pat. No. 5,726,855 issued to Maourou et al. in 1998 and entitled, Apparatus and Method for Enabling the Creation of Multiple Extended Conduction Paths in the Atmosphere. Mourou et al. teaches an apparatus and method for enabling the creation of multiple laser generated extended conduction paths in the atmosphere to safely control the discharge of lightning strikes to a grounding tower. It is also well known in the art that a plasma channel has a low electrical resistance and, once formed, will permit continuous current flow if the energy source that heats the plasma can be maintained. Unlike a normal electrical conductor, the resistance (and voltage drop) across an unconfined plasma channel decreases with increasing current flow, a property called negative resistance. Because plasmas are conductive and respond to electric and magnetic fields and can be efficient sources of radiation, they are usable in numerous applications where such control is needed or when special sources of energy or radiation are required.

Unfortunately, it has been observed that a highly-ionized path will tend to lose its straight-line configuration after creation and will begin to wander transversely in serpentine configurations, which wandering, once started, will grow progressively worse. Moreover, charges carried in plasma channels tend to self constrict due to magnetic forces stemming from the current flowing through the plasma. This phenomenon is known as the "plasma pinch". Upon constricting of the charge as a result of the pinch, the current will then follow the path of least resistance to ground which is by its nature unpredictable and dangerous.

Applicant's methods and apparatus overcome these shortcomings through the creation of at least two concentric conductive paths to and from which the wandering current may "jump", in alternating fashion, thereby maintaining a continuous flow of energy in the desired direction from the ionosphere to the terrestrial target collection apparatus. According to the present invention there is thus provided a ground-to-ionosphere laser-induced conduction path of concentric plasma channels through Earth's atmosphere along which charged particles within the ionosphere may be transmitted to Earth. The term "atmosphere" as used herein means the mass of air surrounding the Earth. The term "plasma" as used herein means a combination of neutrons, ions, electrons and fields that have conductive and collective effects.

The subject apparatus more specifically comprises high power light emitting means, such as a laser array, in operable communication with a high energy output means to accomplish initiation of at least two concentric plasma channels from the Earth's surface to the ionosphere for the transmission of ionospheric energy therethrough. The path need only remain open for relatively short intervals to transmit high orders of energy. The transmitted energy is drawn down through the conductive plasma channels to at least one intervening electrode mounted to a support structure. Charges flow down through the channels to the electrode as they approach ground and the conductive electrode carries the energy away from the laser assembly to avoid damage to or destruction thereof. The at least one electrode will then pass these charges onto a capacitor bank or other storage means to store them. The at least one electrode is mounted to a support structure housing heat dissipation means well known in the nuclear fission art. The light emitting means is preferably insulated from and/or located remotely from the at least one electrode in order to protect the former from damage which could result if the high order energy being transmitted through the plasma channels was not intercepted by the electrode(s). Ideal locations for the subject apparatus are also described.

There has thus been outlined, rather broadly, the more important components and features of the invention in order that the detailed description thereof that follows may be better understood, and in order that the present contribution to the art may be better appreciated. There are, of course, additional features of the invention that will be described hereinafter and which will form the subject matter of the claims appended hereto. In this respect, before explaining at least one embodiment of the invention in detail, it is to be understood that the invention is not limited in its application to the details of construction and to the arrangements of the components set forth in the following description or illustrated in the drawings. The invention is capable of other embodiments and of being practiced and carried out in various ways. Also, it is to be understood that the phraseology and terminology employed herein are for the purpose of description and should not be regarded as limiting. As such, those skilled in the art will appreciate that the conception, upon which this disclosure is based, may readily be utilized as a basis for the designing of other structures, methods and systems for carrying out the several purposes of the present invention. It is important, therefore, that the claims be regarded as including such equivalent constructions insofar as they do not depart from the spirit and scope of the present invention.

Further, the purpose of the foregoing abstract is to enable the U.S. Patent and Trademark Office and the public generally, and especially the scientists, engineers and practitioners in the art who are not familiar with patent or legal terms or phraseology, to determine quickly from a cursory inspection the nature and essence of the technical disclosure of the application. The abstract is neither intended to define the invention of the application, which is measured by the claims, nor is it intended to be limiting as to the scope of the invention in any way.

For a better understanding of the invention, its advantages and the specific objects attained by its uses, reference should be had to the accompanying drawings and descriptive matter in which there is illustrated a preferred embodiment of the invention.

BRIEF DESCRIPTION OF THE DRAWINGS

The invention will be better understood and objects other than those set forth above will become apparent when consideration is given to the following detailed description thereof. Such description makes reference to the annexed drawings wherein.

The invention will be better understood and objects other than those set forth above will become apparent when consideration is given to the following detailed description thereof. Such description makes reference to the annexed drawings wherein.

DETAILED DESCRIPTION OF THE PREFERRED EMBODIMENT

Figure 1:
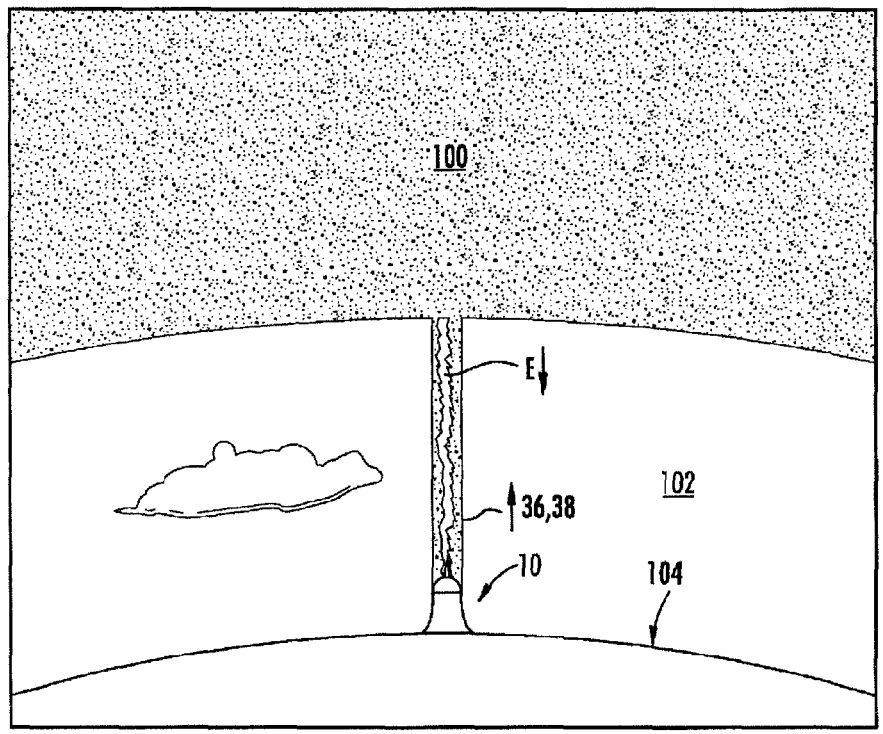
FIG. 1 is a highly simplified schematical view of energy being transmitted from the ionosphere to ground via concentric laser-induced plasma channels produced by the subject apparatus in atmosphere (not-to-scale)

Reference is now made to FIG. 1 in which there is illustrated a highly simplified schematic view of energy E being transmitted from the ionosphere 100 through atmosphere 102 via concentric plasma channels 36,38 generated by the subject apparatus which is designated generally by reference numeral 10. Apparatus 10 is situated on the earth's surface 104 at preferred locations herein described.

Figure 2:
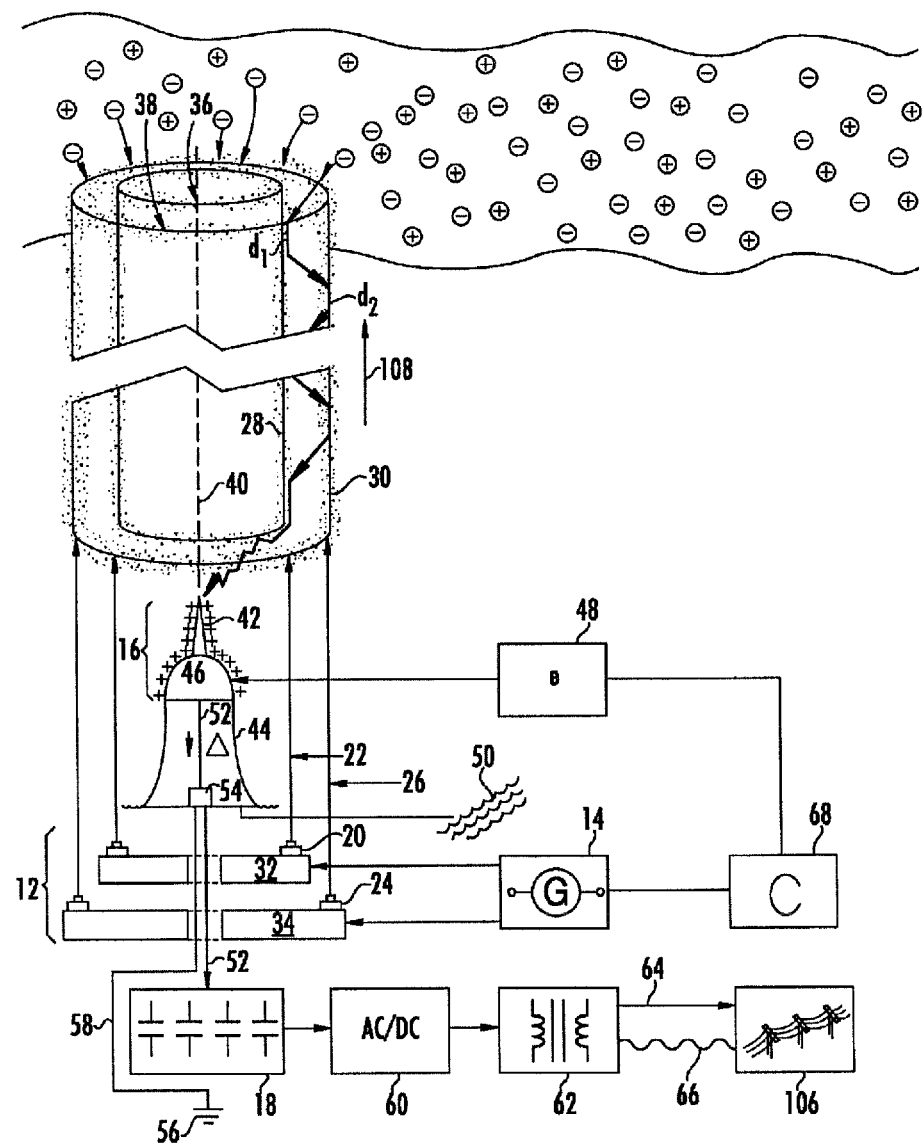
FIG. 2 is simple schematic illustration of the subject apparatus for inducing the flow of charged particles from the ionosphere to ground through concentric laser induced plasma channels (not-to-scale)

Referring to FIG. 2, apparatus 10 is comprised of three primary components: 1) a wireless conductive channel producing means 12 or "atmospheric auger" connected to an energy source 14, 2) charged particle receiving means 16 and 3) energy storage means 18. Each primary component is described in detail below, together with secondary components of the subject apparatus.

Wireless conductive channel producing means 12 (hereinafter "plasma channel producing means") is comprised of first ionizing beam emitting means 20 used to create a first ionizing beam 22, and second ionizing beam emitting means 24 used to create a second ionizing beam 26. The term "ionizing beam emitting means" as used herein includes not only presently known lasers, but also other light sources which will excite ionization in a medium. Lasers utilize the natural oscillations of atoms or molecules between energy levels for generating beams 22,26 of highly amplified and coherent electromagnetic radiation of one or more discrete frequencies, which in turn generate first and second conductive paths 28,30, respectively. The laser means used to establish conductive paths 28,30 should be selected with regard to energy, pulsewidth and wavelength so that it provides control of ionization concentration in each plasma channel. In a gas medium it is important that the ionizing beams 22,26 are controlled for optimum transmission of a charge.

Technologies that facilitate the creation of the subject con-channels include recent advancements in ultra-high intensity pulsed lasers and their transmission optics which together can generate a plasma field and have precise control over the field's geometry. Information regarding the manipulation and transmission of high powered lasers is generally classified due to the nature of their application. It is well known however, that successful high power laser systems are currently operation, and it follows that the condition and control optics are in place to handle such a system. According to an embodiment described herein, this technology is adapted to generate the con-channels. Ultra-high power pulsed or continuous lasers are now available in the Megawatt class, such as the Airborne Laser (ABL) built by Northrop Grumman. The lasers employed by the subject apparatus and methods should also by capable of varying the chirp of the input pulse to achieve control of the filamentation over horizontal kilometric distances. By way of example, one embodiment may include a Ti:sapphire CPA (Chirp Pulse Amplification) laser system operating at 10 Hz and delivering a maximum output power of 0.2 TW per pulse. The pulse duration approximates 130-135 fs (FWHM). The beam may be truncated by a circular aperture having a desired radius in order to have a more stable beam shape with a perfect or near-perfect circular symmetry.

Those skilled in the art will readily recognize that there are two main mechanisms responsible for the photoionization of air: avalanche ionization and multiphoton ionization. In avalanche ionization, or sometimes known as cascade ionization, the bound electrons in the valence shell of air molecules usually have an energy bandgap greater than the incident laser photon energy. However, a small number of free electrons exist. These free electrons may be generated through high altitude ionization of air molecules, radicals, break-up of aerosol molecules, thermal ionization or multiphoton ionization. These free electrons constitute the required seed electrons for avalanche ionization. Although these free electrons may exist in small number initially and have low kinetic energy, through a process called inverse bremsstrahlung, they can be accelerated to gain enough kinetic energy to impact ionize a molecule in collision, resulting in more free but slower electrons. The whole process repeats itself with more electrons gaining higher kinetic energy, exceeding the ionization potential of the bound electrons, to impact even more molecules, leading to an avalanche with the resultant formation of a plasma. In this inverse bremsstrahlung process, the free electrons absorb photons through the laser field when they collide with atoms or molecules. A free electron does not absorb laser energy directly without any collision. This is because the free electron simply quivers in the oscillating laser field, and when averaged over an optical cycle, it does not gain any net energy. The other dominant photoionization mechanism is the multi photon ionization process. Through this process, bound electrons may absorb several laser photons simultaneously to overcome their ionization potential. Multiphoton ionization depends largely on the laser operating frequency. Either method may be employed with the subject application.

In order to transform first and second conductive paths 28,30 into the desired cylindrical-shaped first and second plasma channels 36,38 it is necessary to cause their movement around a common central axis 40. First and second beam moving means 32,34 are provided for this purpose and are comprised of either or a combination of mechanical or optical means. The manner in which at least two concentric plasma channels are generated using first and second ionizing beams 22,26 is not critical provided the properties (i.e., length, ionization intensity, uniformity, etc.) of each channel is controllable. Applicant's co-pending U.S. patent application entitled, Wireless Transmission Of Energy Through Concentric Laser-Induced Plasma Channels In Atmosphere, filed contemporaneously with the instant application and incorporated herein in its entirety, teaches at least one method of producing at least two concentric plasma channels. As previously stated, the term "channel" means a conduit, substantially ring-shaped in cross-section, having walls comprised of partially ionized gas ("plasma"), each wall being created by the movement of first and second conductive paths 28,30, respectively. First plasma channel 36 and second plasma channel 38 share a common central longitudinal axis; they are concentric channels (or co-axial from a three-dimensional linear perspective). In alternate embodiments, the outermost channel and any channels between it and the innermost channel may be shaped like a funnel or frustum, narrower at point of origin and progressing outward as it extends into the atmosphere. U.S. Pat. No. 6,377,436 issued to Margolin on Apr. 23, 2002 and entitled, Microwave Transmission Using a Laser-Generated Plasma Beam Waveguide, which said reference is incorporated herein in its entirety to the extent it is not inconsistent with the explicit teachings of this specification, teaches various directed energy beam systems in the form of channels or "shells". Although the Margolin shells are used as a guide through which microwaves are transmitted rather than high order energy, the means by which the shells are created are instructive and find utility in the instant case. It should be appreciated that multiple concentric plasma channels may be created with at least two being the minimum required and at least three channels being preferred.

With continued reference to FIG. 2, power to each ionizing beam emitting means is supplied by energy source 14. The voltage required is related to and increases with the length of the path to be ionized. The energy in Joules required to excite the gas molecules in the path into ionization can be calculated in advance knowing the density of the molecules and the approximate diameter and length of the conductive path over which the energy from the ionosphere is to be transmitted. By way of example, energy source 14 may be comprised of a Marx generator which is capable of generating a high-voltage pulse. Voltages produced may exceed 2 million volts.

Charged particle collection means 16 comprises a charged particle attraction structure. Such structure includes at least one elongated electrode 42 generally somewhat similar to the lightning rods which are normally used to direct the electrical energy to ground when protecting buildings and the like. Electrode 42 is mounted to a support structure 44 generally, and to a conductive hemispherical dome 46 thereof specifically. A charge indicated by symbol + is applied to the at least one electrode 42 and/or dome 46 via charging means 48 which can impart a charge via conduction or induction (friction being impractical). Note that the + symbol is used as a substitute for the more conventional symbol "e" which of course can be either positive or negative. The hemispherical shape allows for the widest variance of charge wandering during energy transfer to the Earth's surface. This orb-like structure may include openings through its ionosphere-facing surface to allow the transmission of at least one ionizing beam therethrough with the actual light emitting means located remotely enough from the orb surface to mitigate against damage from expected energy loads.

The induction of ionospheric energy utilizing the subject apparatus 10 may be likened to the induction of a lighting strike, only of greater magnitude. A lightning strike discharges about 1-10 billion joules of energy and produces a current of some 30,000-50,000 amps, which heats the surrounding air to over 20,000 degrees Celsius. A single lightning bolt unleashes as much energy as blowing up a ton of TNT. Because of the enormous amount of heat attendant with the collection of ionospheric energy, even over a relatively short period of time, heat dissipation means are associated with the subject apparatus 10. In one embodiment, heat dissipation means may be housed within support structure 44 as indicated by the "down arrow delta" symbol. Alternatively, heat dissipation means may be connected to support structure 44 but remote therefrom. Guidance for the design of a safe and efficient cooling system may be found in the nuclear science field of art for example, or in other power generation facilities. The main types (mechanisms) of heat transfer to be employed are 1) Wet cooling towers or simply cooling towers which operate on the principle of evaporation wherein the working fluid and the evaporated fluid (usually $H_2O$) are one and the same; 2) Dry coolers which operate by heat transfer through a surface that separates the working fluid from ambient air, such as in a heat exchanger, utilizing convective heat transfer (they do not use evaporation); and 3) Fluid coolers which are hybrids that pass the working fluid through a tube bundle, upon which clean water is sprayed and a fan-induced draft applied; the resulting heat transfer performance is much closer to that of a wet cooling tower, with the advantage provided by a dry cooler of protecting the working fluid from environmental exposure. In all applications, water may be tapped from a nearby water source 50 or other fluids used. Steam turbines (not shown) may be utilized to extract thermal energy from pressurized steam and convert it into rotary motion for the generation of electricity which may be utilized locally to power system components and/or fed to a local power grid 106. Note that the release of steam in the ionospheric energy induction process will interfere with the photo-ionization of surrounding air and is therefore undesirable.

Once ionospheric particles are attracted to charged particle collection means 16 in the above described manner, the resulting electrical current is directed through the heat dissipation means via a first wire conductor 52 downwardly through support structure 44 to a surge arrestor assembly designated generally by reference numeral 54. Such surge arrestor assembly is connected directly to ground 56 and has a switching assembly (not shown for purposes of clarity). The switch assembly is a structural adaptation of the surge arrestor assembly 54 serves automatically or manually to direct current flow either to energy storage means 18 via second wire conductor 58 when the conductive path is "open" or to ground 56 when the conduction path is closed. Energy storage means 18 may be comprised of, for example, a capacitor bank as illustrated or some other suitable means such as a collection coil of superconductive material as has been proposed in the art.

Various systems, methods and apparatus may be employed to convert the energy stored in energy storage means 18 to use. By way of example only, when energy stored within energy storage means 18 is required, a suitable switching apparatus (not shown for purposes of clarity) may be activated and the stored energy passed through a converter apparatus 60 structurally adapted to convert current coming from energy storage means 18 from D.C. to A. C. The A.C. current may then be passed through a transformer 62 for the purpose of regulating voltage before the current is directed into the power grid 106 for practical distribution and use. Energy may be transmitted from transformer 62 to power grid 106 via conventional power take-off means 64 and/or wirelessly 66 in a manner described in applicant's aforementioned co-pending application.

In operation, ionizing beam emitting means may be applied in continuous or, more likely, pulsed fashion, as determined by controller 68 used to activate energy source 14. Alternatively, at least one ionizing beam emitting means may be operated in continuous fashion while at least one other ionizing beam emitting means may be operated in pulsed fashion. The intensity of both may additionally be modulated. In the event that the emitting means provides outputs which are continuous the control circuit will comprise merely on-off means, but where pulsed lasers and/or a pulsed energy source are used, the control circuit will comprise a trigger, suitable for firing each ionizing beam emitting, and also for controlling the rate at which each repeat their outputs. Pulsed systems have the advantage of providing quiescent intervals between their output pulses during which the ionized plasma in the portion of the beam which is located between the electrodes can die out to permit the system to start all over again and re-establish a straight-line highly conductive path of narrow and well defined proportions. The periodic extinguishing of each channel in a pulsed system is beneficial since it allows unstable ionization to die out so that it can be reestablished in a new channel which is both straight, and highly defined and concentrated. The subject apparatus provides a means of assuring that at least one plasma channel 36,38, etc. is always open at any point in time thereby assuring that the energy to be transmitted always has a pre-defined conductive path to travel upon to the target collection means 16. For instance, while plasma channel 32 is extinguished, controller 68 assures that plasma channel 36 is active. As previously stated, the periodic discharges from the at least two ionizing beam emitting means can be synchronized to produce, in the aggregate, a constant directional plasma channel between the ionosphere and ground. The overall transition of the Earth's atmosphere within the concentric laser induced plasma channels from insulator to conductor is in correlation to the Bose-Hubbard (boson Hubbard) model. In contrast to relatively low order energy transfer at colder temperatures demonstrated by fermion conductors, the subject invention provides high order energy transfer at ambient temperatures using Hubbard's principles as applied to bosons.

FIG. 2 illustrates the manner in which energy is transmitted from its point of origin in the ionosphere 104 to collection means 16. First and second plasma channels 36,38 comprise a plasma which is highly conductive and which is propagating along directional arrow 108. Prior to transmission of ionospheric charged particles, designated by circumscribed minus signs, through plasma channels 36,38, the channels remain fairly well defined for a usable interval of time. However, when the energy to be transmitted is introduced into and travels along a given plasma channel, the charge will eventually begin to self constrict due to magnetic forces stemming from the current flowing through the plasma causing the charge to close upon itself and leaving the energy being transmitted with no clear path to follow, potentially striking unintended targets.

The employment of at least two, and preferably at least three, concentric plasma channels in accordance with the subject invention mitigates such occurrences by providing adjacent conductive paths which ionosphereric energy can "jump to" when losing its point-to-point direction. After the charge transitions to its new conductive path, the last-travelled path is regenerated by its corresponding ionization beam emitting means. The subject apparatus and methods, therefore, provide that at least one conductive path is always open and in close proximity to a neighboring current-carrying plasma channel.

In the example illustrated in FIG. 2, a potential exists between free charged particles in the ionosphere, on the one hand, and charged electrode 42 and dome 46 on the other. First and second plasma channels 36,38 provide a bridge between them for the transmission of the former to the latter. Charged particles from the ionosphere are drawn into the walls of whichever plasma channel is open at the time (in the instant illustration, plasma channel 36, and begin to travel downwardly there along a first distance or time interval $d_1$ until the current is pinched and can no longer travel along its current channel. At that time the errant current will seek out a new path of least resistance on the way to collection means 16. The closest path of least resistance will be the then open neighboring channel 38 onto which the current will "jump" and then travel a second distance or time interval $d_2$. As energy traverses its new channel the previously traversed plasma channel 36 will be reformed serving as the next adjacent "jump site" for current to find when it again experiences pinch. The charge will jump from channel to channel, traveling a distance or time interval along each, in alternating or "stair-step" down fashion until reaching energy collection means 16. Once energy collection means 16 reaches capacity, power to the light emitting means may be relinquished and the magnetic spin of the transferred charged particles will close the field. It is possible, of course, that in certain circumstances a particular charge will remain open while traversing a single channel to the target. What is important is that there is always a predefined alternate directional conductive path in close proximity for the energy to travel upon.

As previously mentioned, the ionosphere is most distinct above 80 km (50 miles) where the ions and free electrons move rapidly under the influence of electrical forces—the ionospheric wind—and where the ionosphere is highly conductive. During fair weather there is an electric potential difference of 250,000 to 500,000 volts between the ionosphere and the Earth's surface. Accordingly, construction of the subject apparatus in locations which facilitate tapping this region of the atmosphere are desirable, particularly at high elevations where the air to be ionized contains a lower percentage of contaminants which adversely affect propagation of conductive plasma channels.

Figure 3:
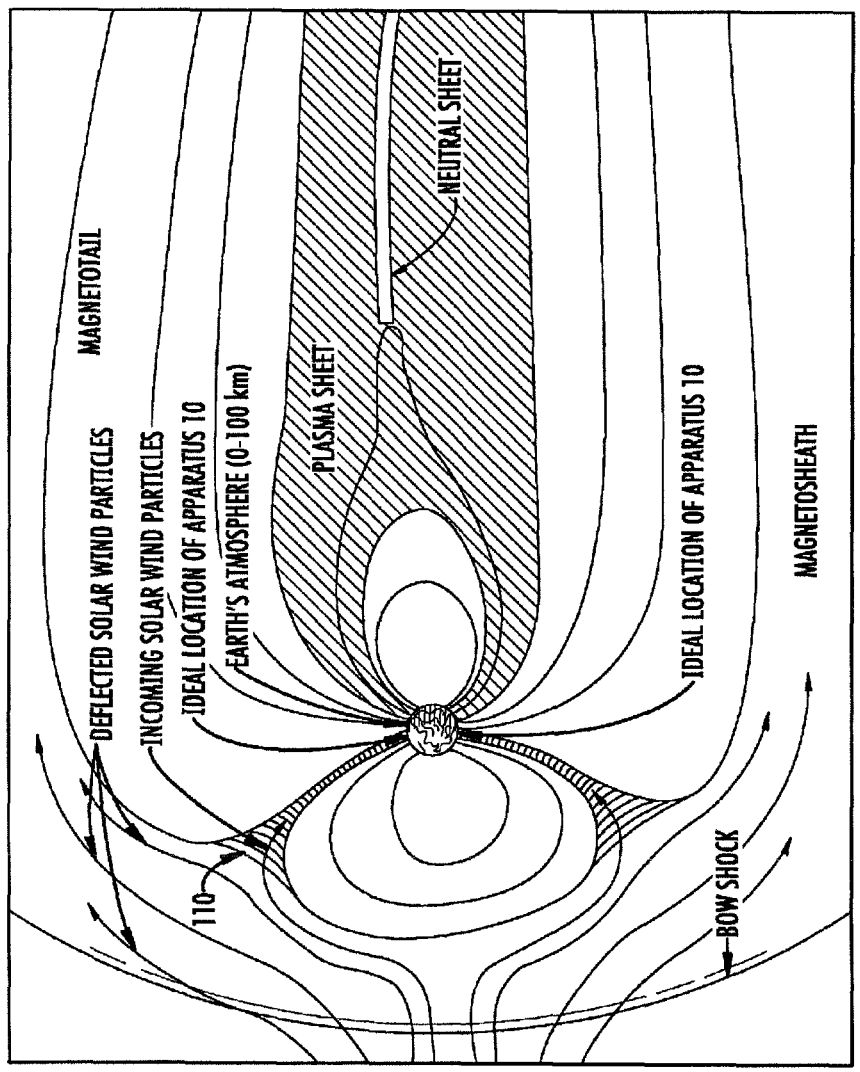
FIG. 3 is a simplified schematical view of the earth with a magnetic field (force) line along which the present invention may be carried out (not-to-scale).

Additionally, reference now being made to FIG. 3, in the upper regions of the ionosphere, beginning several hundred kilometers above Earth's surface and extending tens of thousands of kilometers into space, is the magnetosphere, a region where the behavior of charged particles is strongly affected by the magnetic fields of Earth and the Sun. The solar wind is a stream of charged particles ejected from the upper atmosphere of the sun. It consists mostly of electrons and protons with energies of about 1 keV. As the solar wind approaches Earth's well-developed magnetic field, the particles are deflected by the Lorentz force. This region, known as the magnetosphere, causes the particles to travel around the planet rather than bombarding the atmosphere or surface. However some of the charged particles leak through this magnetic barrier and become trapped in the Van Allen radiation belt. A smaller number of particles from the solar wind manage to travel, as though on an electromagnetic energy transmission line, to the Earth's upper atmosphere and ionosphere in the auroral zones. More specifically, the charged particles travel through funnel-like openings (cusps 110) at the North and South Poles, releasing tremendous energy when they hit the upper atmosphere. The Northern and Southern Lights (auroras) are the visible evidence of this energy transfer from the Sun to the Earth. These regions, approximately 13 latitude 14 n longitude, and where magnetic field lines intersect the Earth, are believed to be ideal for employment of the subject apparatus 10. It may be advantageous to locate the subject system and apparatus at a dwindling or soon to be decommissioned mine, because of pre-existing environmental permits and useful tunnels.

Although the present invention has been described with reference to the particular embodiments herein set forth, it is understood that the present disclosure has been made only by way of example and that numerous changes in details of construction may be resorted to without departing from the spirit and scope of the invention. Thus, the scope of the invention should not be limited by the foregoing specifications, but rather only by the scope of the claims appended hereto.

The invention claimed is:

1. An apparatus for inducing the flow of charged particles from the charge-rich outer atmosphere to ground, comprising:
   a first ionizing beam emitter, wherein the first ionizing beam emitter produces a first ionizing beam, wherein the first ionizing beam is moved to form a first conductive channel through the atmosphere and in communication with the charge-rich outer atmosphere, wherein the first conductive channel comprises a first wall of partially ionized atmosphere;
   a second ionizing beam emitter, wherein the second ionizing beam emitter produces a second ionizing beam, wherein the second ionizing beam is moved to form a second conductive channel through the atmosphere and in communication with the charge-rich outer atmosphere, wherein the second conductive channel comprises a second wall of partially ionized atmosphere, wherein the first conductive channel and the second conductive channel are concentric and separated by a distance therebetween;
   a charged particle collector, wherein the charged particle collector comprises at least one electrode; and
   a storage element, wherein a flow of charged particles from the charge-rich outer atmosphere through the first and second conductive channels flows through the at least one electrode to the storage element and the storage element stores the charged particles.

2. The apparatus for inducing the flow of charged particles from the charge-rich outer atmosphere to ground of claim 1, wherein the charged particle collector comprises a support structure, wherein the at least one electrode is attached to the support structure.

3. The apparatus for inducing the flow of charged particles from the charge-rich outer atmosphere to ground of claim 2, wherein the support structure comprises a conductive hemispherical dome.

4. The apparatus for inducing the flow of charged particles from the charge-rich outer atmosphere to ground of claim 2, wherein one or more of the at least one electrode and the support structure are charged.

5. The apparatus for inducing the flow of charged particles from the charge-rich outer atmosphere to ground of claim 3, wherein one or more of the at least one electrode and the hemispherical dome are charged.

6. The apparatus for inducing the flow of charged particles from the charge-rich outer atmosphere to ground of claim 1, wherein the first conductive channel is within the second conductive channel, wherein the second conductive channel is funnel shaped being more narrow at its point of origin.

7. The apparatus for inducing the flow of charged particles from the charge-rich outer atmosphere to ground of claim 1, wherein the first ionizing beam emitter is a first pulsed ionizing beam emitter, wherein the first ionizing beam emitter produces a first pulsed ionizing beam through the atmosphere.

8. The apparatus for inducing the flow of charged particles from the charge-rich outer atmosphere to ground of claim 7, wherein the second ionizing beam emitter is a second pulsed ionizing beam emitter, wherein the second ionizing beam emitter produces a second pulsed ionizing beam through the atmosphere.

9. The apparatus for inducing the flow of charged particles from the charge-rich outer atmosphere to ground of claim 1, further comprising a charge source, wherein the charge source applies a charge to the at least one electrode.

10. The apparatus for inducing the flow of charged particles from the charge-rich outer atmosphere to ground of claim 1, further comprising an energy source, wherein the energy source supplies energy to the first ionizing beam emitter and the second ionizing beam emitter.

11. A method for inducing the flow of charged particles from the charge-rich outer atmosphere to ground, comprising:
    producing a first ionizing beam through the atmosphere;
    moving the first ionizing beam to form a first conductive channel through the atmosphere and in communication with the charge-rich outer atmosphere, wherein the first conductive channel comprises a first wall of partially ionized atmosphere;
    producing a second ionizing beam through the atmosphere;
    moving the second ionizing beam to form a second conductive channel through the atmosphere and in communication with the charge-rich outer atmosphere, wherein the second conductive channel comprises a second wall of partially ionized atmosphere, wherein the first conductive channel and the second conductive channel are concentric and separated by a distance therebetween;
    providing a charged particle collector, wherein the charged particle collector comprises at least one electrode; and
    providing a storage element, wherein a flow of charged particles from the charge-rich outer atmosphere through the first and second conductive channels flows through the at least one electrode to the storage element and the storage element stores the charged particles.

12. The method for inducing the flow of charged particles from the charge-rich outer atmosphere to ground of claim 11, wherein the charged particle collector comprises a support structure, wherein the at least one electrode is attached to the support structure.

13. The method for inducing the flow of charged particles from the charge-rich outer atmosphere to ground of claim 12, wherein the support structure comprises a conductive hemispherical dome.

14. The method for inducing the flow of charged particles from the charge-rich outer atmosphere to ground of claim 12, wherein one or more of the at least one electrode and the support structure are charged.

15. The method for inducing the flow of charged particles from the charge-rich outer atmosphere to ground of claim 13, wherein one or more of the at least one electrode and the hemispherical dome are charged.

16. The method for inducing the flow of charged particles from the charge-rich outer atmosphere to ground of claim 11, wherein the first conductive channel is within the second conductive channel, wherein the second conductive channel is funnel shaped being more narrow at its point of origin.

17. The method for inducing the flow of charged particles from the charge-rich outer atmosphere to ground of claim 11, wherein producing the first ionizing beam through the atmosphere comprises producing a first pulsed ionizing beam through the atmosphere.

18. The method for inducing the flow of charged particles from the charge-rich outer atmosphere to ground of claim 17, wherein producing the second ionizing beam through the atmosphere comprises producing a second pulsed ionizing beam through the atmosphere.

19. The method for inducing the flow of charged particles from the charge-rich outer atmosphere to ground of claim 11, further comprising providing a charge source, wherein the charge source applies a charge to the at least one electrode.

20. The method for inducing the flow of charged particles from the charge-rich outer atmosphere to ground of claim 11, further comprising providing an energy source, wherein the energy source supplies energy to the first ionizing beam emitter and the second ionizing beam emitter.

* * * * *